United States Patent

Saneyoshi et al.

Patent Number: 6,122,597
Date of Patent: Sep. 19, 2000

[54] VEHICLE MONITORING APPARATUS

[75] Inventors: Keiji Saneyoshi; Keiji Hanawa, both of Tokyo, Japan

[73] Assignee: Fuji Jukogyo Kabushiki Kaisha, Tokyo, Japan

[21] Appl. No.: 09/048,332

[22] Filed: Mar. 26, 1998

[30] Foreign Application Priority Data

Apr. 4, 1997 [JP] Japan ................................. 9-086877

[51] Int. Cl.[7] .................................................. G01C 3/14
[52] U.S. Cl. ........................ 701/301; 701/300; 382/171
[58] Field of Search ................................ 701/301, 300; 348/51, 113, 116, 118, 140; 382/106, 104, 168, 170, 171, 172, 199; 340/435, 436, 903; 356/12

[56] References Cited

U.S. PATENT DOCUMENTS

| | | | |
|---|---|---|---|
| 5,303,019 | 4/1994 | Irie | 356/1 |
| 5,410,346 | 4/1995 | Saneyoshi | 348/116 |
| 5,515,448 | 5/1996 | Nishitani | 382/106 |
| 5,592,567 | 1/1997 | Kilger | 382/199 |
| 5,825,915 | 10/1998 | Michimoto et al. | 382/154 |

FOREIGN PATENT DOCUMENTS

5-26554  2/1993  Japan .

Primary Examiner—Tan Nguyen
Attorney, Agent, or Firm—Smith Gambrell & Russell, LLP

[57] ABSTRACT

A vehicle monitoring apparatus for obtaining a distance image including an image data and three-dimensional distance information and for monitoring surrounding conditions on the basis of the distance image, comprises: means for dividing the distance image into a plurality of blocks composed of picture elements, means for collecting the blocks having a similar distance data and for grouping the blocks into an independent group, means for calculating an area size of the independent group, means for extracting the image data as an object data if the area size of the group is larger than a predetermined value and for discarding the image data as a false data if the area size is smaller than the predetermined value, means for preparing a histogram having a lateral axis representing a deviation amount and a longitudinal axis representing a frequency corresponding to a number of the image data, and means for detecting an object and a distance to the object by deleting the frequency having a smaller number of the image data than a threshold value along the lateral axis on the histogram. Thereby, false data can be removed from the image data and a mismatching can be prevented.

13 Claims, 9 Drawing Sheets

VEHICLE MONITORING APPARATUS

BACKGROUND OF THE INVENTION

1. Field of the Invention

The present invention is related to a monitoring apparatus of a vehicle for recognizing road and traffic conditions around the vehicle based on distance images.

2. Prior Arts

With increased number of vehicles and with increased number of traffic accidents, the conception of Advanced Safety Vehicle (ASV) is becoming one of primary strategies in designing a vehicle. In particular, ASV raises the intelligence level of a vehicle through the state of the art electronic technologies. In recent years, various safety devices such as issuing an alarm to inform a vehicle driver of a likelihood of collision, stopping a vehicle, decreasing or increasing the speed of the vehicle by detecting a vehicle traveling ahead or an obstacle through a television camera, a laser-beam radar or the like, have been proposed.

The inventor of the present invention, in Japanese Patent Application Laid-open No. Toku-Kai-Hei 5-265547, discloses a technique in which pictures taken by two stereoscopic cameras are converted into distance images, these distance images are divided into lattice-like small regions at an interval of 8 to 20 picture elements and solid objects are detected for each small region.

This prior art is primarily intended to be used for detecting obstacles in highways or roads for motoring and therefore the roughness of pictures this like, i.e., 8 to 20 picture elements per small region, is at a permissible level because the size of obstacles can be considered to be relatively large.

However, when the subject vehicle travels on narrow or crowded street roads, in order to judge a possibility of collision or contact with an obstacle lying on the road with high precision, it is necessary to detect a correct position of the obstacle and its more detailed configuration such as an unevenness of the surface of the object or protuberances or indents of the obstacle as well. To cope with a situation like this, the distance image must be divided at a finer interval than 8 to 20 picture elements. On the other hand, such a rough interval as 8 to 20 picture elements tends to incur erroneous detections due to noises included in the image.

SUMMARY OF THE INVENTION

It is therefore an object of the present invention to provide a vehicle monitoring apparatus capable of obtaining more precise and more reliable surrounding information which is free from noises. To achieve the object, the vehicle monitoring apparatus for obtaining a distance image including an image data and a three-dimensional distance information and for monitoring surrounding conditions on the basis of the distance image, comprises:

means for dividing the distance image into a plurality of blocks composed of at least one picture element;

means for collecting the blocks having a similar distance data and-for grouping the blocks into an independent group if the blocks include image data;

means for calculating an area size of the independent group;

means for extracting the image data as an object data if the area size of the group is larger than a predetermined value and for discarding the image data as a false data if the area size is smaller than the predetermined value;

means for preparing a histogram having a lateral axis representing a deviation amount and a longitudinal axis representing a frequency corresponding to a number of the image data; and means for detecting an object and a distance to the object by deleting the frequency having a smaller number of the image data than a threshold value along the lateral axis on the histogram.

DETAILED DESCRIPTION OF THE PREFERRED EMBODIMENT

Figure 1:
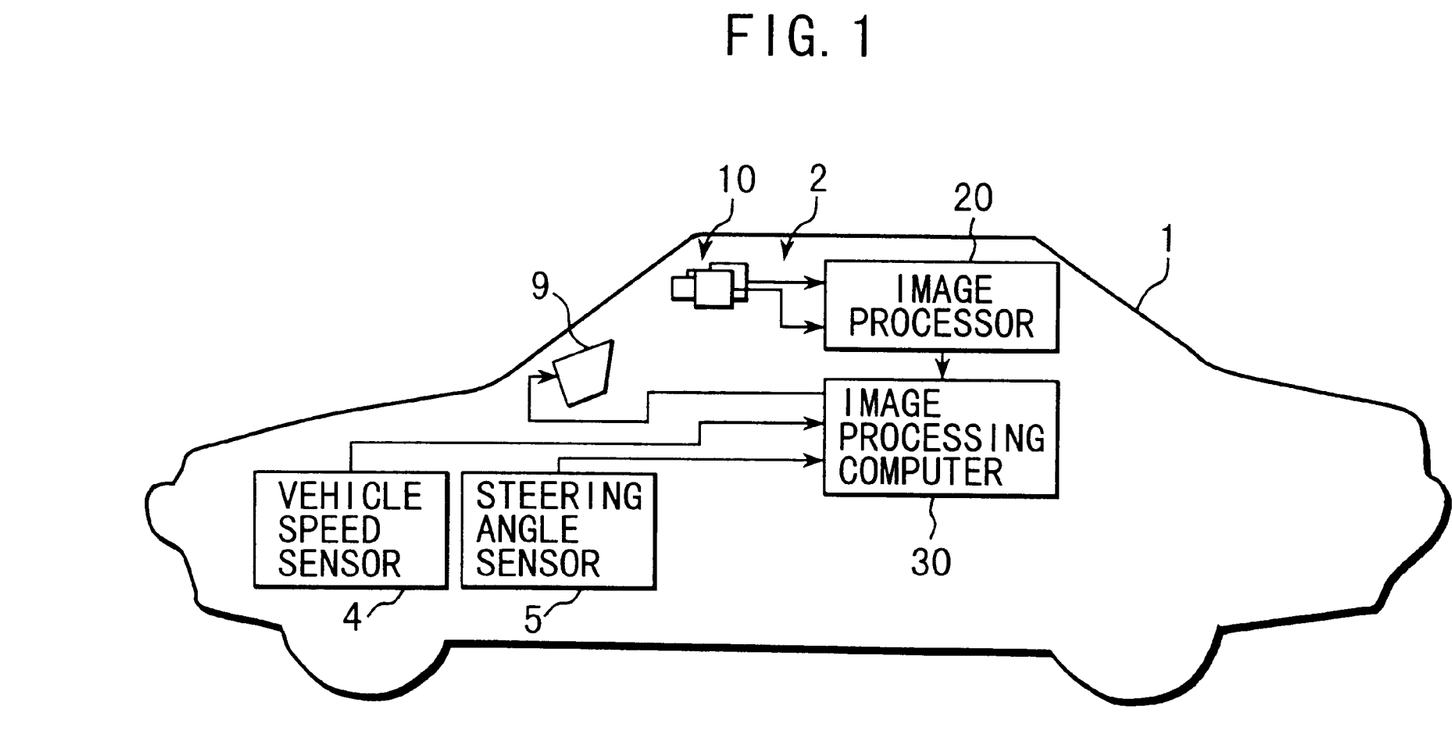
FIG. 1 is a schematic diagram of a vehicle monitoring apparatus according to the present invention.

Referring now to FIG. 1, reference numeral 1 denotes a vehicle on which a vehicle monitoring apparatus 2 is mounted for imaging objects within a visible scope ahead of the vehicle and recognizing the objects for monitoring. The vehicle monitoring apparatus 2 comprises a stereoscopic optical system 10 for imaging objects from two different positions, an image processor 20 for processing images of these objects and obtaining three-dimensional distance distribution information and an image processing computer 30 for detecting the configuration and position of the objects solidly based on thus obtained distance distribution information and judging whether or not the objects are obstacles to raise alarms.

The image processing computer 30 is connected with sensors such as a vehicle speed sensor 4, a steering angle sensor 5 and the like to detect a present traveling condition of the vehicle and also connected with a display 9 provided at the front of a vehicle driver to inform hazard. Further, it is possible to connect with an interface for controlling actuators (not shown) so as to avoid a collision with obstacles or a vehicle traveling ahead.

The stereoscopic optical system 10 is composed of a pair of left and right CCD (Charge Coupled Device)cameras 10a, 10b. A pair of stereoscopic pictures taken by the CCD cameras 10a, 10b are processed in the image processor 20 according to a principle of triangulation to obtain three-dimensional distance distribution over an entire image.

The image processing computer 30 reads the distance distribution information from the image processor 20 to detect three-dimensional positions with respect to the configuration of roads and solid objects such as vehicles and obstacles at high speed and judges a possibility of collision or contact with these detected objects based on the traveling condition detected by the vehicle speed sensor 4 and the steering angle sensor 5 of the self vehicle to inform the vehicle driver of the result of the judgment through the display 9.

Figure 2:
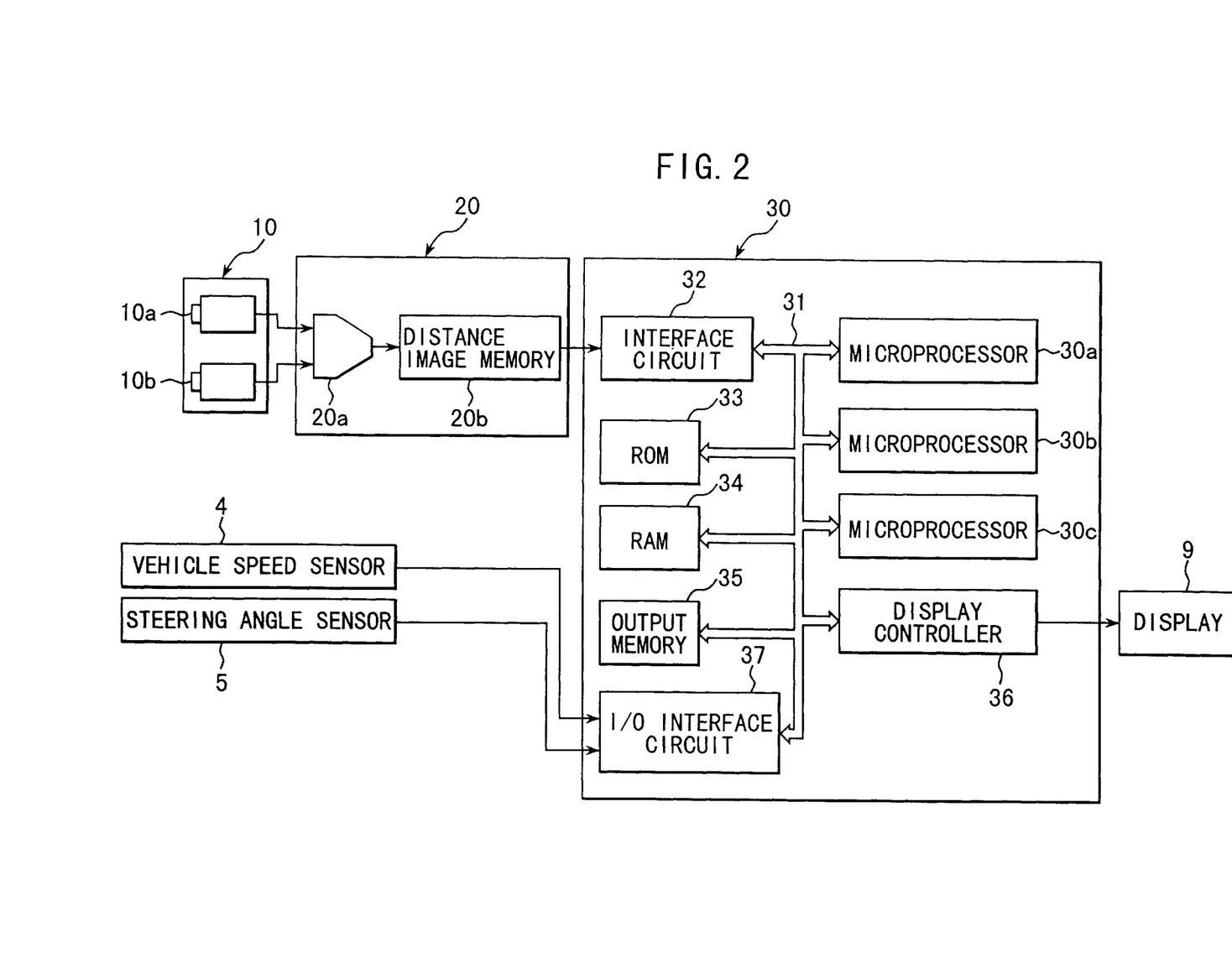
FIG. 2 is a block diagram of a vehicle monitoring apparatus according to the present invention.

FIG. 2 shows a constitution of the image processor 20 and the image processing computer 30. The image processor 20 comprises a distance detecting circuit 20a for producing distance distribution information and a distance image memory 20b for memorizing this distance distribution information. The distance detecting circuit 20a calculates a distance to a given object by selecting a small region imaging an identical portion of the object from the left and right stereoscopic pictures taken by the CCD cameras 10a, 10b, respectively and then obtaining a deviation between these small regions and outputs in the form of three-dimensional distance distribution information.

Figure 6:
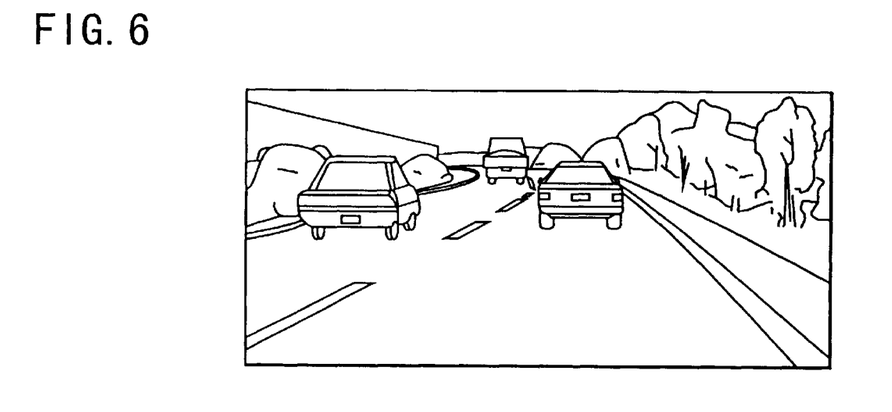
FIG. 6 is a drawing showing an example of an image taken by a on-board camera.

FIG. 6 shows an example of either of images taken by the left and right CCD cameras 10a, 10b. When this image is processed by the distance detecting circuit 20a, the distance distribution information outputted from the distance detecting circuit 20a is expressed as a distance image like picture as shown in FIG. 7.

Figure 7:
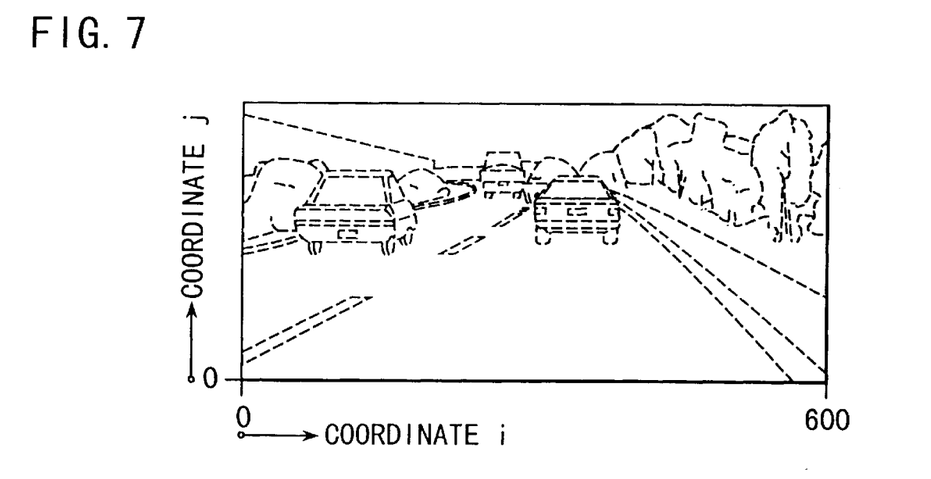
FIG. 7 is a drawing showing an example of a distance image.

The example of the picture shown in FIG. 7 has a picture size composed of 600 (laterally)×200 (longitudinally) picture elements. Doted portions show ones having a large difference in brightness in the picture shown in FIG. 6. Further, in this example, the distance detecting circuit 20a treats the distance image as an image composed of 150 (laterally)×50 (longitudinally) blocks, i.e., 4×4 picture elements for one block or one small region. The calculation of distance or the calculation of the deviation amount is performed for each block of the left and right images.

The image processing computer 30 comprises a microprocessor 30a primarily for detecting roads and the like, a microprocessor 30b primarily for detecting solid objects based on the configuration of a road detected and a microprocessor 30c primarily for identifying a preceding vehicle or an obstacle based on the positional information of the detected solid objects and for judging a possibility of collision or contact with the preceding vehicle or the obstacle and these microprocessors 30a, 30b, 30c are connected in parallel with each other through a system bus 31.

The system bus 31 is connected with an interface circuit 32 to which the distance image is inputted from the distance image memory 20b, a ROM 33 for storing the control program, a RAM for memorizing miscellaneous parameters produced during calculations, an output memory 35 for memorizing the result of processing, a display controller 36 for controlling the display 9 and an I/O interface circuit 37 to which signals are inputted from the vehicle speed sensor 4 and the steering angle sensor 5.

As shown in FIG. 7, the distance image has a coordinate system composed of a lateral axis i, a longitudinal axis j and a vertical axis dp with an origin of the coordinates placed at the left below corner of the distance image. The vertical axis dp indicates a distance to an object which corresponds to the deviation amount between blocks. Therefore, in the image processing computer 30, a point (i, j, dp) on the distance image is transformed into a coordinate system provided in the real space to perform processes such as recognition of the road configuration, detection of the position of solid objects and the like.

That is to say, setting X axis on the right side with respect to the traveling direction of a self vehicle (vehicle 1), Y axis in the upward direction of the vehicle 1 and Z axis in the forward direction of the vehicle and placing an origin of the coordinates on the road surface underneath the center of two CCD cameras 10a, 10b, X-Z plane (Y=0) coincides with the road surface, if the road is flat. Accordingly, the point (i, j, dp) on the distance image can be transformed into a point (x, y, z) in the real space as follows:

$$x = CD/2 + z \cdot PW \cdot (i - IV) \quad (1)$$
$$y = CH + z \cdot PW \cdot (i - JV) \quad (2)$$
$$z = KS/dp \quad (3)$$

where CD is an interval between CCD cameras 10a, 10b; PW is an angle of visibility per picture element; CH is a height of CCD cameras when measured from the road surface; IV, JV are coordinates of an infinite point directly in front of the vehicle 1 on the image; and KS is a distance coefficient (KS=CD/PW).

Rewriting the above equations (1), (2) and (3) as follows:

$$i = (x - CD/2)/(z \cdot PW) + IV \quad (4)$$
$$j = (y - CH)/(z \cdot PW) + JV \quad (5)$$
$$dp = KS/z \quad (6)$$

Next, processes in the image processing computer 30 will be described.

In the microprocessor 30a, first, actual lane markers of a road are extracted from three-dimensional positional information contained in the distance image which is stored in the distance image memory 20b and then the configuration of the road is recognized by modifying parameters of a built-in road model so as to agree with the actual road configuration.

The road configuration is expressed by a plurality of three-dimensional linear equations. That is, the imaged left and right lane markers of the road on which the subject vehicle is traveling are divided into a plurality of intervals determined according to distance and the road model is formed by a plurality of broken lines each of which is expressed for every interval in the following three-dimensional linear equations:

$$x = a \cdot z + b \quad (7)$$
$$y = c \cdot z + d \quad (8)$$

where a, b are parameters of a linear equation extended in the horizontal direction in the coordinate system of the real space and c, d are parameters of a linear equation extended in the vertical direction in the coordinate system of the real space.

In the microprocessor 30b, first, data above the road surface are selected from the distance image based on the road configuration which has detected by the microprocessor 30a and data of solid objects are extracted after removing noises included in the distance image by means of a group filter process which will be described more in detail hereinafter. Further, the distance image is divided into lattices at a specified interval and a histogram is formed for every lattice. The distance to a solid object is calculated based on thus formed histogram. Further, based on the distance data of solid object, a profile of the solid object is extracted to identify the kind of the object based on the configuration, size and position of the object.

Figure 3:
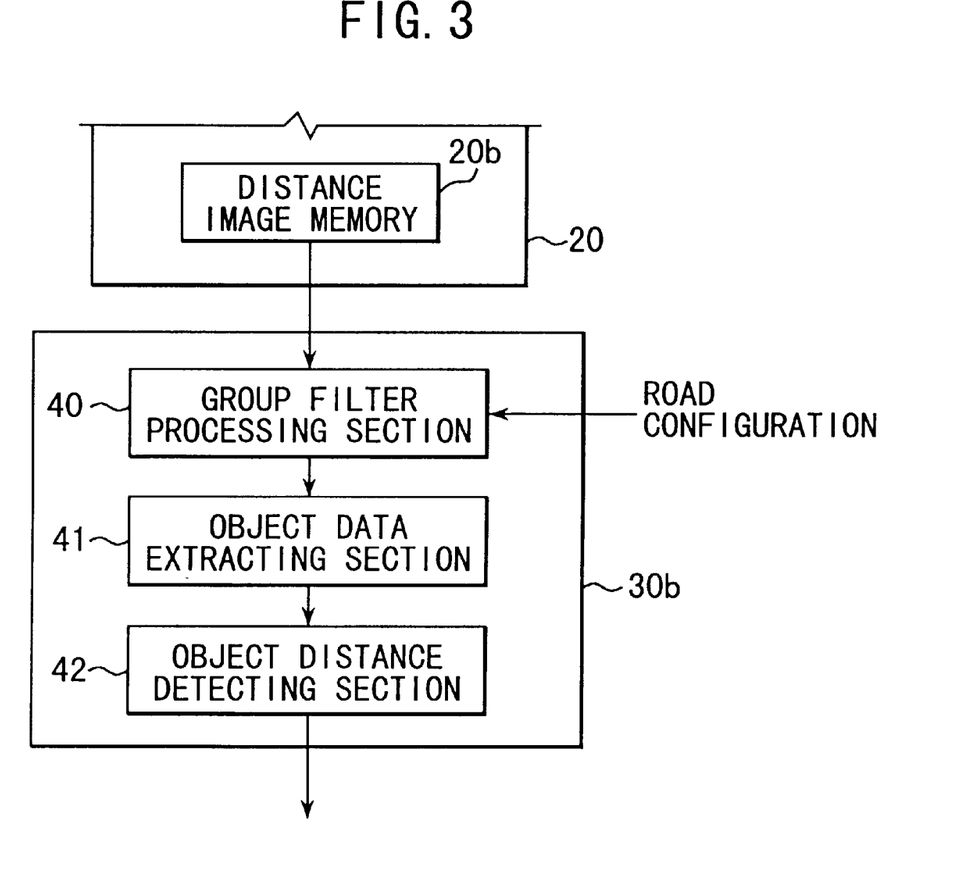
FIG. 3 is a functional block diagram showing a process of a distance detection.

FIG. 3 shows a function of the distance detection of solid objects in the microprocessor 30b. As shown, the microprocessor 30b comprises a group filter processing section 40, an object data extracting section 41 and an object distance detecting section 42. In the group filter processing section 40, the distance image is divided into groups having approximately the same deviation amount by means of a group filter described below and in the object data extracting section 41, picture elements located at higher positions than the road surface and having a larger group area (namely, number of picture elements, more specifically number of blocks belonging to the same group) than a threshold value are extracted as solid object data. Further, in the object distance detecting section 42, the distance image is divided in the lateral direction at a specified interval and a histogram is prepared for each division. If there is a position showing a frequency larger than a threshold value in the histogram, that position is a distance of the solid object situated in the division.

The group filter is of a software filter for removing noises included in the distance image by detecting groups having similar deviation amounts from among nearby groups. In detecting the groups having similar deviation amounts, a given block is compared with four adjacent (top, bottom, left and right) blocks and if the difference of the deviation amount is within ±1 picture element, the block is put into the same group. Thus, when a group is completed, the group is denoted by a group number and the group number is registered into a group number memory. Further, the area size of the group is calculated and stored in a group area memory.

Generally, if an object is recognized properly, the deviation amount shows a tendency to change continuously in the image. That is, if a mismatching (erroneously recognizing as the same object) occurs, the deviation amount of the group tends to differ substantially from that of nearby groups. The group filter selects only groups having large area sizes, neglecting small area sizes so as to reduce adverse effects of the mismatching.

Figure 8:
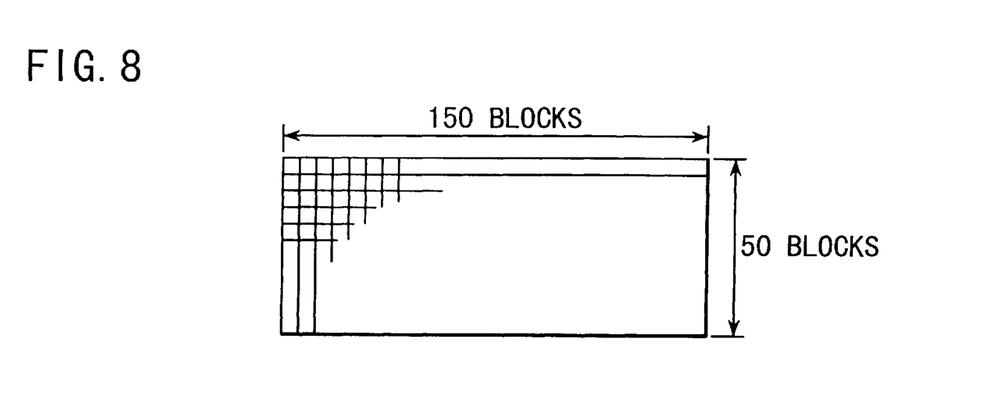
FIG. 8 is an explanatory view of a group number memory.
Figure 9:
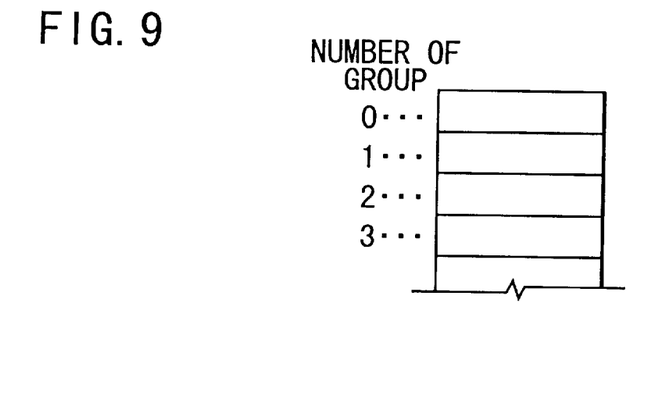
FIG. 9 is an explanatory view of a group area memory.

The group number memory, as shown in FIG. 8, is prepared so as to agree with the number of the distance images and its respective addresses store a group number belonging to the corresponding group of distance image. The group area memory, as shown in FIG. 9, is prepared so as to agree with the group number and its respective addresses memorize a number of blocks (area sizes) belonging to the corresponding group.

On the other hand, in the microprocessor 30c, other vehicles or obstacles existing on the adjacent left and right lanes are extracted, a possibility of collision or contact therewith is judged from the position and size of those vehicles or obstacles and their relative speeds with respect to the self vehicle and the result of the judgment is displayed on the display 9.

Unexamined Japanese Patent Applications No. Toku-Kai-Hei 5-265547 and Toku-Kai-Hei 6-266828 which are proposed by the inventor of the present invention describe in detail the aforementioned process of forming distance image, that of detecting road configuration based on the distance image, that of extracting profiles of objects and that of judging a possibility of collision or contact with the detected objects.

Figure 4:
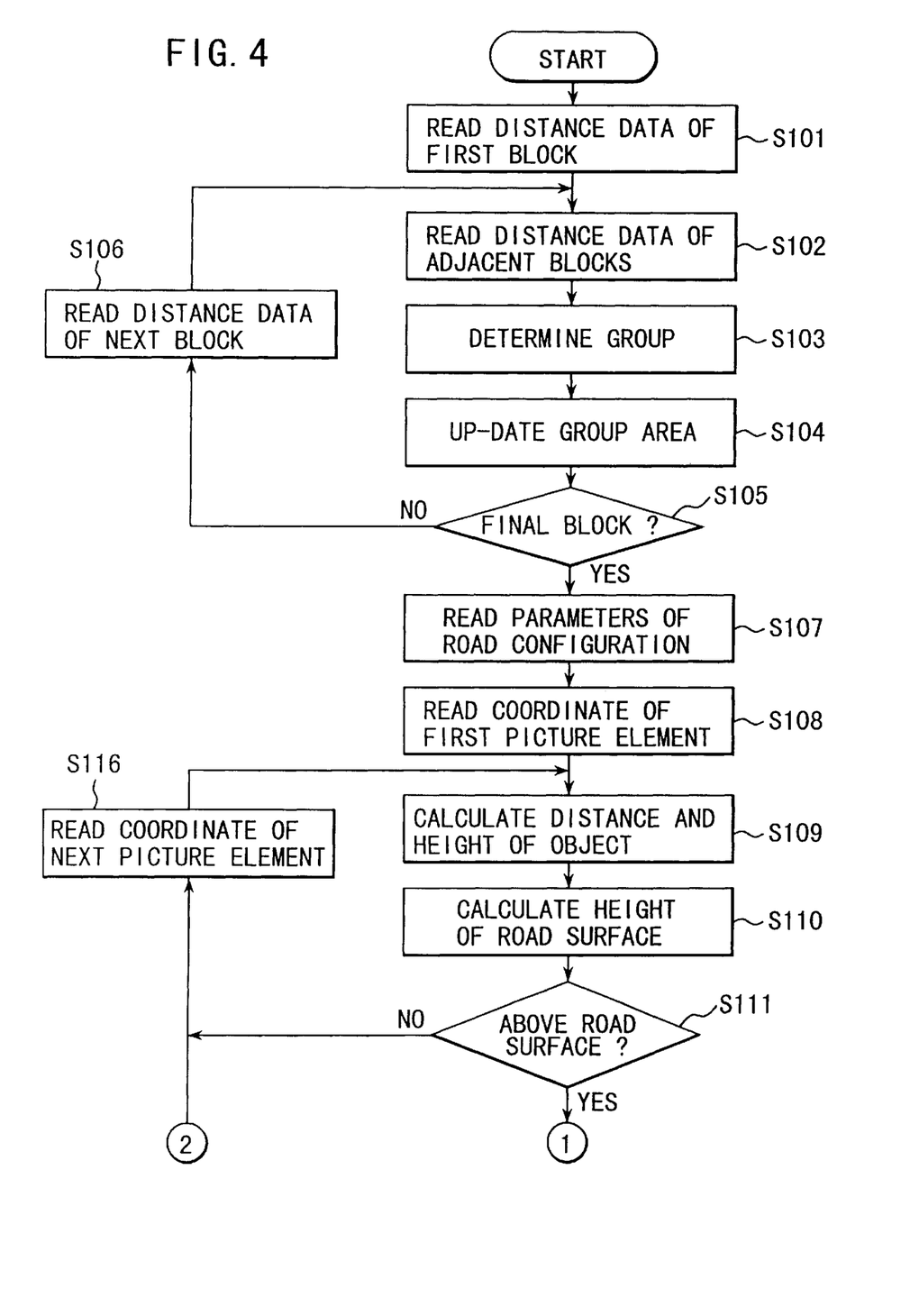
FIG. 4 is a flowchart showing a process of a distance detection.
Figure 5:
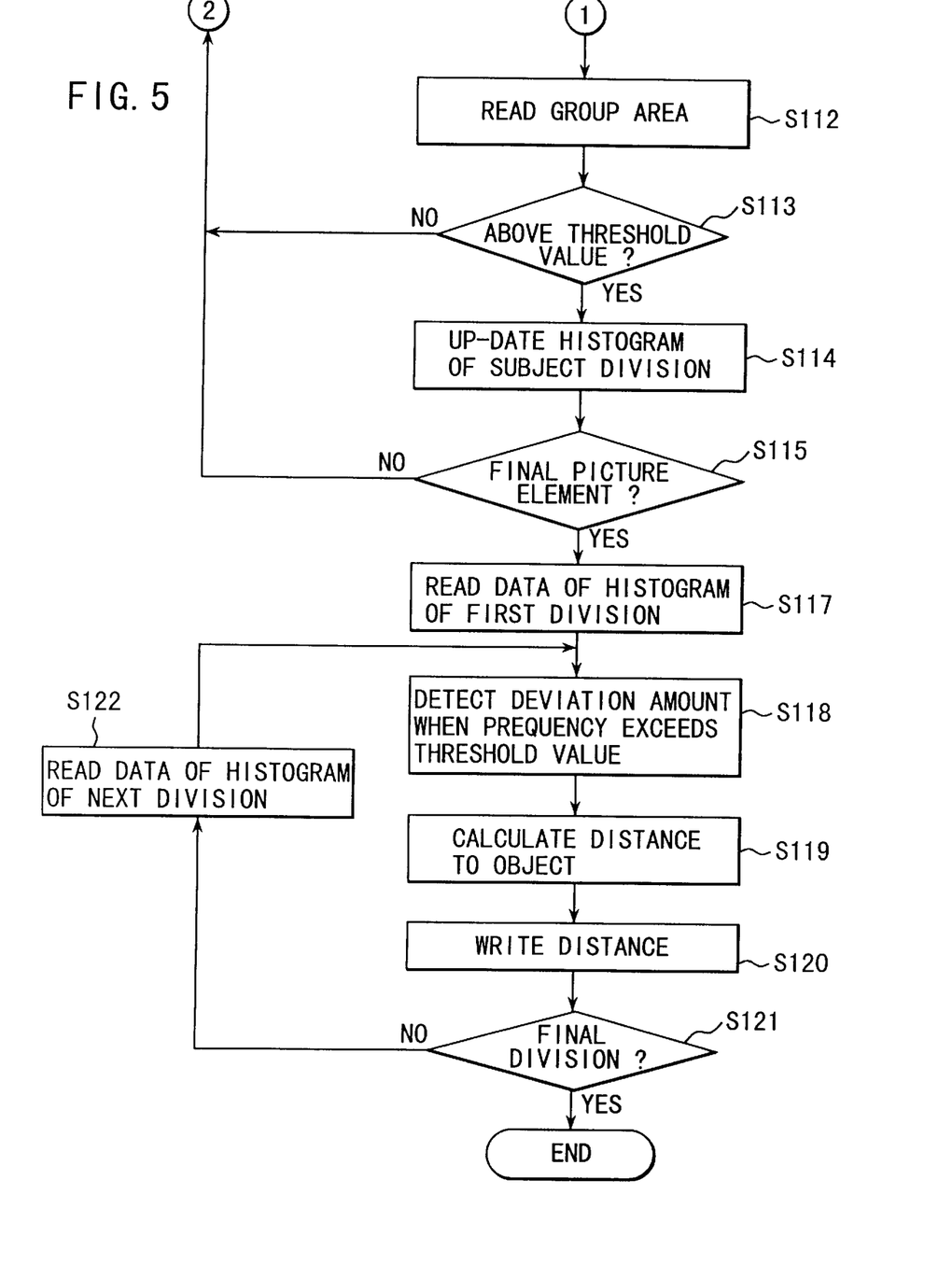
FIG. 5 is a flowchart continued from a flowchart of FIG. 4.

Next, a process for the distance detection in the microprocessor 30b will be described according to flowcharts of FIG. 4 and FIG. 5.

First at a step S101, distance data of the first block and at the next step S102, distance data of the adjacent blocks are read respectively and at a step S103 a group is determined. The order of determination of the group is: starting from the far left below block and going on in the right direction. When the process reaches a far right block, returning to a far left block above the far left below one and again going on in the right direction.

Figure 10:
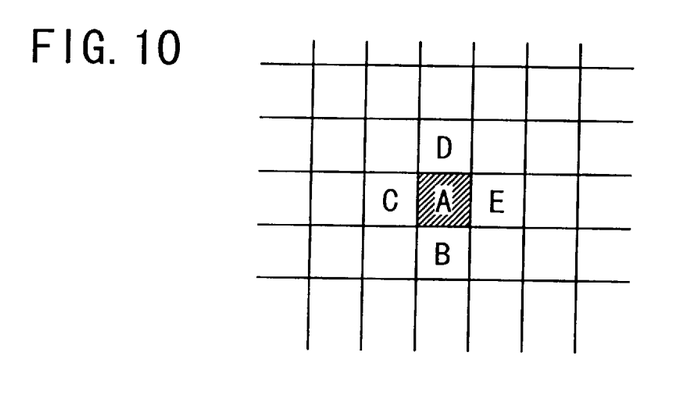
FIG. 10 is an explanatory view showing a block and neighboring blocks of the distance image.

The order of the group determination will be described below more specifically. FIG. 10 shows an example of a block "A" neighboring with blocks "B", "C", "D" and "E". In this case, the blocks "B" and "C" are assumed to have been processed and their belonging group is assumed to have been determined. The belonging group of blocks "E" and "D" are not yet determined. Where Dpa is the deviation amount of the block "A" and Dpb, Dpc, Dpd and Dpe are deviation amounts of the blocks "B", "C", "D" and "E", respectively, the group determination of the block "A" is performed as follows:

When the deviation amount of the block "A" is compared with the neighboring blocks, "B", "C", "D" and "E", following six cases are logically considered:

Case 1. $Dpa \cong Dpb$ and $Dpa \cong Dpc$

Case 2. $Dpa \cong Dpb$ and $Dpa \not\cong Dpc$

Case 3. $Dpa \not\cong Dpb$ and $Dpa \not\cong Dpc$

Case 4. $Dpa \not\cong Dpb$ and $Dpa \not\cong Dpc$ and $Dpa \cong Dpd$

Case 5. $Dpa \not\cong Dpb$ and $Dpa \not\cong Dpc$ and $Dpa \not\cong Dpd$ and $Dpa \cong Dpe$ Case 6. $Dpa \not\cong Dpb$ and $Dpa \not\cong Dpc$ and $Dpa \not\cong Dpd$ and $Dpa \not\cong Dpe$ where the symbol "$\cong$" means that the deviation amount of the block "A" agrees with that of a neighboring block and the symbol "$\not\cong$" means that the deviation amount of the block "A" disagrees with that of a neighboring block.

The treatment of the block "A" is as follows:

Case 1; This case is divided into two cases.

When the block "C" does not belong to the same group as the block "B", the blocks "A" and "C" are put into the group of the block "B" and when the block "C" belongs to the same group as the block "B", the blocks "A" is put into the group of the block "B".

Case 2; Unconditionally, the block "A" is put into the-group of the block "B".

Case 3; Unconditionally, the block "A" is put into the group of the block "C".

Case 4; The block "A" is put into a new group.

Case 5; The block "A" is put into a new group.

Case 6; The block "A" is put into a group "0" (isolated).

That is to say, when the block "A" is close in distance to a "below" or "left" block whose group number is known, the block "A" is classified into the same group as the "below" or "left" block and when the block "A" is not close in distance to a block whose group number is known and is close in distance to a "right" or "above" block whose group number is unknown, the block "A" is classified into a new group having a possibility of growing. Further, when neither of the adjacent blocks is close to the block "A", i.e., the block "A" is isolated, the block "A" is treated as belonging to a group "0".

Thus, at a step S103, when the belonging group of a block is determined, a group number is written onto a corresponding address of the group number memory and the program goes to a step S104. At the step S104, the group area of a corresponding address of the group area memory is updated. Further, the program steps from the step S104 to a step S105 where it is checked whether the currently processing block is a final block or not. If the currently processing block is not a final block, the program returns to the step S102 and the same processes are repeated hereinafter. If the process reaches a final block, the program goes to a step S107.

For example, in case where it is concluded that the blocks "A" and "C" are classified into the group of the block "B" according to the aforementioned logic, the group number of the block "B" is written onto an address corresponding to the block "A" of the group number memory and at the same time the group number memorized in the address corresponding to the block "C" is updated to the group number of the block "B". Further, the group area memorized in the address corresponding to the group number which has belonged to the block "C" of the group area memory is reduced by 1 and the group area size memorized in the address corresponding to the group number which has been belonged to the block "B" is increased by 2. On the other hand, in case where it is concluded that the block "A" is classified into a new group, the group number of the new group is denoted by a number added to the present group number by 1.

Next, the program goes from the step S105 to a step S107 where the road configuration parameters are read. Then, at a step S108 a coordinate (i, j, dp) of the first picture element is read and the program goes to a step S109 where a coordinate (x, y, z) showing a three-dimensional position of an object is obtained from the aforementioned equations (1), (2) and (3).

Then, the program goes to a step S110 in which the height yr of the road surface at the distance z is calculated using the aforesaid linear equations (7), (8) presenting the road configuration. After that, the program goes to a step S111 in which it is investigated whether or not the data of the object is above the road surface based on the height H calculated by the following formula (9) of the object. When it is judged that the data of the object is below the road surface, the program returns to the step S109 through a step S116 and the same steps are repeated hereinafter. At the step S116, a coordinate of the next picture element is read.

$$H = y - yr \qquad (9)$$

In this case, if the height H of an object is 0.1 meters or smaller, since the object of this size is supposed to be a lane marker, a stain or a shadow on the road, the data of the object are discarded, Similarly, since the object which is located at a position higher than the self vehicle is supposed to be a bridge or a signpost, that object is discarded. Thus, only the data of objects which are estimated to be solid objects on the road are selected.

Next, the program goes from the step S111 to a step S112 (shown in FIG. 5) where following processes are executed: obtaining a coordinate (i, j, dp) of a block, obtaining a group number Gn of the belonging group of the block by looking-up the group number memory, obtaining a group area size Ga of the group by referring to the group memory based on this group number Gn and reading the group area size Ga.

Further, at a step S113 it is checked whether or-not the group area size Ga is larger than a predetermined threshold value (for example, 4 to 10 blocks). If it is larger than the threshold value, it is judged that the picture elements are data of a solid object and the program goes to a step S114. If it is smaller than the threshold value, the picture elements are regarded as false data which might have been produced by noises or the like and these data are discarded. Then, the program returns to S109 through S116.

At the step S114, the histogram of the subject division is updated by the picture elements extracted as the data of the solid object and then at a step S115 it is checked whether or not the process reaches the final picture element. If the process has not yet reached the final picture element, the program goes back to the step S116 where a coordinate of the next picture element is read and returns to the step S109 for continuing similar processes.

Figure 11:
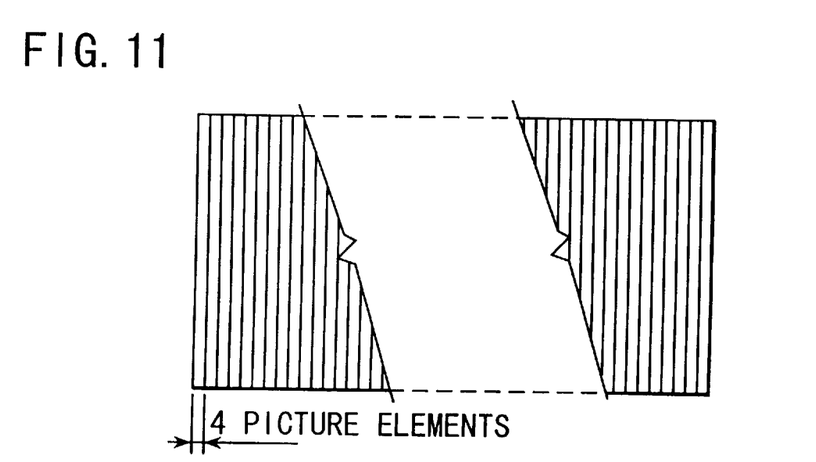
FIG. 11 is an explanatory view showing divisions of the distance image.
Figure 12:
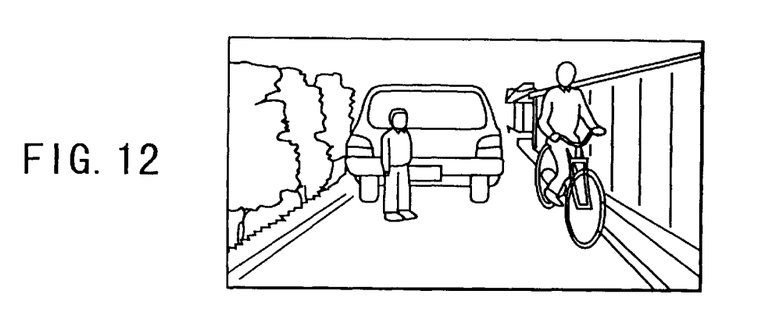
FIG. 12 is a view showing an example of road situations.
Figure 13:
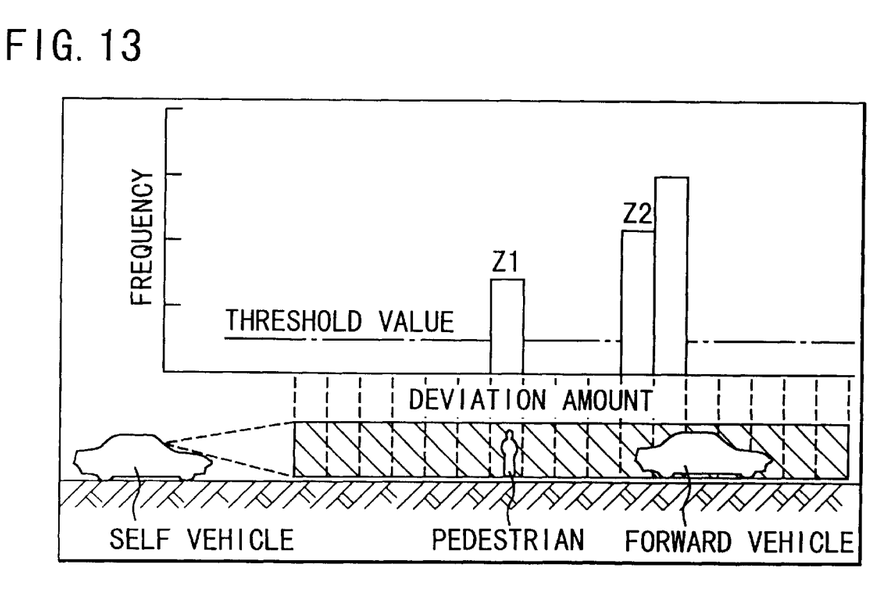
FIG. 13 is an explanatory view showing a relationship between a histogram and objects.

The histogram is prepared as follows:

As shown in FIG. 11, the distance image is divided into a plurality of lattices each of which has a width of one block, i.e., an interval of four picture elements and the histogram is prepared for each division (lattice). That is, the coordinates of the histogram are composed of a frequency in the longitudinal direction and a number of deviation amount in the lateral direction. The frequency indicates a number of data of the object data for deviation amount within a division. Further, the number of deviation amount indicates a distance to the object. FIG. 13 shows an example of the histogram for a picture as illustrated in FIG. 12.

When it is judged at the step S115 that the process reaches a final picture element, the program goes to a step S117 where data of the histogram of the first division are read. At the next step S118, when the frequency of this histogram exceeds a threshold value, a deviation amount at this moment is detected and at a step S119 the distance to the object is calculated from this deviation amount according to the aforementioned equation (3).

That is, the histogram of a given division is investigated as follows:

The histogram is started to be surveyed from the larger deviation amount towards the smaller deviation amount. When the frequency data exceeds a threshold value for the first time, the deviation amount of this moment and the distance calculated from the deviation amount is detected as a first distance (Z1) in this division. The survey of the histogram goes on and when the frequency data exceeds again the threshold value after the frequency goes down below the threshold value, the calculated distance is detected as a second distance (Z2). Further, the survey goes on and a third and fourth distances are detected.

It should be noted that in this histogram, the number of data is almost zero where there is no object, since most of false data are deleted by the group filter. Thus, the relationship between the distribution of data and the existence or nonexistence of an object is visualized and one histogram can tell that the a plurality of objects exist in a given direction. For example, as shown in FIG. 12, it is possible to detect a pedestrian, a forward vehicle and a person riding a bike simultaneously. Under the condition illustrated in FIG. 12, the prior art can not detect a plurality of objects simultaneously, because only the forward vehicle that shows a maximum frequency in the histogram is detected and other objects are neglected.

Further, since most false data have been deleted from the histogram, the threshold value for distinguishing between the false data and the real data (real objects) can be established to be smaller than that of the prior art and as a result -it is possible to detect objects of small size, objects which are difficult to be imaged under such adverse conditions as nights and the like or objects whose distance data are insufficient.

When the distances for all solid objects are finished to be detected within one division, the program goes from the step S119 to a step S120 where these distances are written onto the memory and at a step S121 it is checked whether or not the process reaches the last division. If the process has not reached the last division, the program goes to the step S122 where the histogram data of the next division are read and returns to the step S118. When it is judged at the step S121 that the process has reached the last division, the program is finished.

According to the present invention, since the division of the distance image has almost no false data, its width can be made substantially smaller (theoretically, up to the width of one picture element)than that of the prior art and as a result the three-dimensional positional resolution of the detected object can be enhanced, thereby an unevenness, protuberances or indents of the object surface can be detected.

Figure 14:
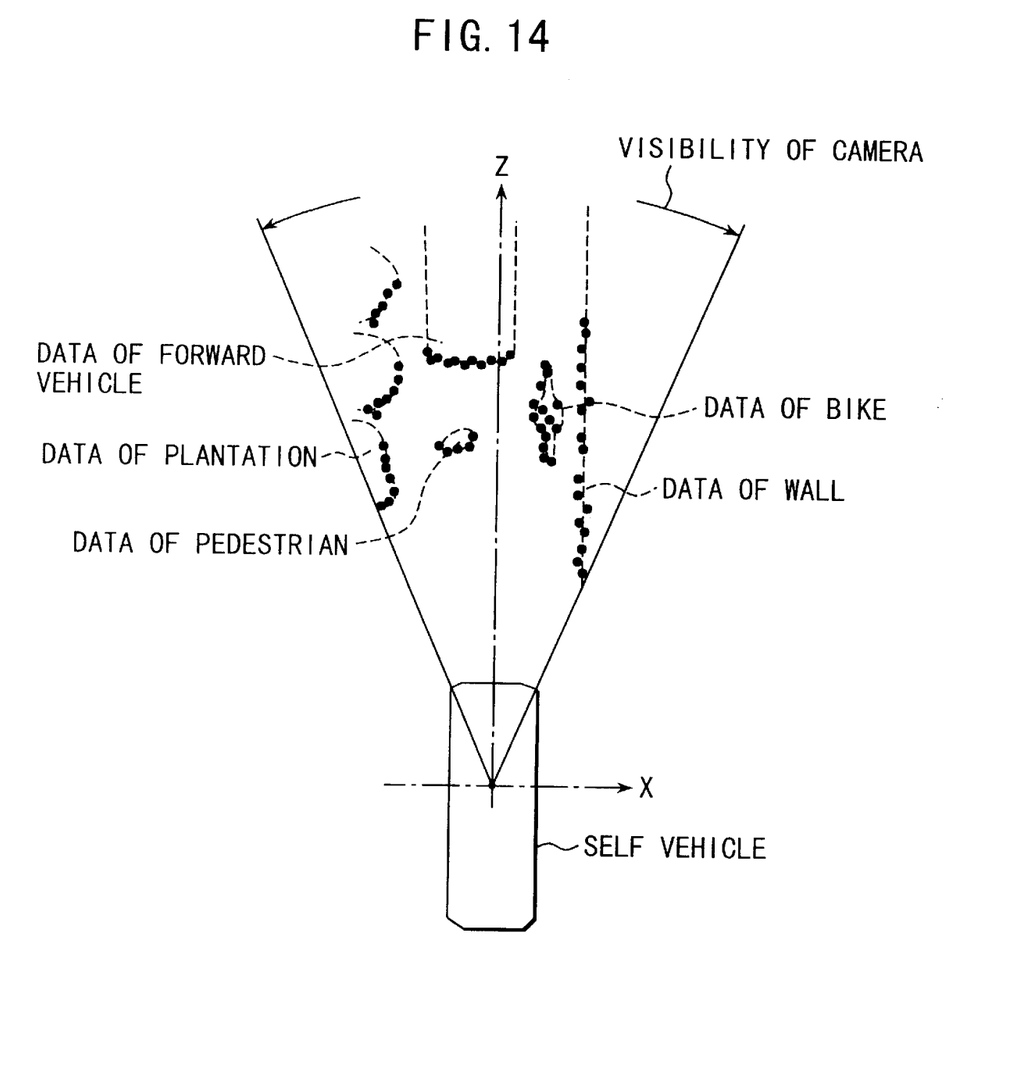
FIG. 14 is an explanatory view showing a result of detection of the position of objects.

The result of the aforesaid processes is shown in FIG. 14. This drawing is a top view showing on an X - Z plane the detected images of a pedestrian, a plantation-, a forward vehicle, a person on the bike, a wall and the like as shown in FIG. 14.

In summary, as described hereinbefore, the vehicle observation apparatus according to the present invention can have a high three-dimensional resolution due to a thinner division of the distance image than that of the conventional arts in preparing the histogram for detecting objects, thereby detailed configurations of objects can be detected.

Further, since most of false data are deleted from the histogram data by the group filter, the existence of objects can be known from the histogram more accurately and as a result the positions of a plurality of objects can be detected simultaneously in the forward direction. Further, since the threshold value for discriminating between the false data and the real data can be lowered, small objects or obscure objects can be detected, thereby more sophisticated, more precise and more reliable surrounding information can be obtained.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A vehicle monitoring apparatus for obtaining a distance image including an image data and a three-dimensional distance information and for monitoring surrounding conditions on the basis of said distance image, comprising:

means for dividing said distance image into plurality of blocks composed of at least one picture element;

means for grouping said blocks having a similar distance data into an independent group;

means for calculating an area size of said independent group;

means for extracting said image data as an object data of said area size of said independent group is larger than a predetermined value and for discarding said image data as a false data if said area size of said independent group is smaller than said predetermined value;

means for preparing a histogram on the basis of the image data thus extracted by said extracting means said histogram having a lateral axis representing a deviation amount and a longitudinal axis representing a frequency corresponding to a number of said image data; and means for detecting an object and a distance to said object by deleting said frequency having a smaller number of said image data than a threshold value along said lateral axis on said histogram.

2. The vehicle monitoring apparatus according to claim 1, wherein when said block has a similar distance to said adjacent blocks whose group number is known, said block is grouped into the same group as said adjacent blocks and when said block-has a similar distance to said adjacent blocks whose group number is unknown, said block is grouped into a group denoted by a new number.

3. The vehicle monitoring apparatus according to claim 1, wherein said distance image is divided into lattice-like divisions and said histogram is prepared for each of- said divisions.

4. The vehicle monitoring apparatus according to claim 1, further comprising:

a group number memory for memorizing a number of said group to which said image data belongs and a group area memory for memorizing a number of said image data to which each of said groups belong as an area size.

5. A monitoring apparatus mounted on a vehicle for watching an object in a vicinity thereof, having a pair of stereoscopic CCD cameras mounted on a front portion of said vehicle for obtaining a distance image including an image data and a three-dimensional distance information about said object and for producing an image signal, comprising:

stereoscopic image processing means responsive to said image signal for deriving a distance information about said object and for transmitting a distance signal;

means for forming groups based on said distance information;

road detecting means responsive to said distance signal for deriving a road shape by extracting a line painted on a road in front of said vehicle and for outputting a road signal;

group filtering means responsive to said distance signal and said road signal for calculating an area of each group after distinguishing whether a deviation of said distance image is within a predetermined criteria and for producing an area signal;

data extracting means responsive to said area signal for extracting area signals larger than a predetermined threshold value and for outputting a data signal; and object distance deriving means responsive to said data signal for calculating an exact distance from said vehicle to said object in said each group by making a histogram through eliminating false data so as to be precisely detectable of an unevenness of a surface of said object.

6. The monitoring apparatus according to claim 5, wherein:

said group is registered into the same number as that of an adjacent known group when said group has a similar distance to said adjacent known group and said group is registered into a new number when said group has an approximately similar distance to an unknown group.

7. The monitoring apparatus according to claim 5, wherein:

said distance image is divided into lattice-like divisions and said histogram is prepared for each group.

8. The monitoring apparatus according to claim 5, further comprising:

a group number memory for memorizing a number of said groups to which said image data belongs; and a group area memory for memorizing a number of said image data to which each of said groups belong as an area size.

9. A vehicle monitoring method for obtaining a distance image including an image data and a three-dimensional distance information and for monitoring surrounding conditions on the basis of said distance image, the method comprising the steps of:

dividing said distance image into a plurality of blocks composed of at least one picture element;

grouping said blocks having a similar distance data into an independent group;

calculating an area size of said independent group;

extracting said image data as an object data if said area size is larger than a predetermined value;

discarding said image data as false data if said area size is smaller than said predetermined value;

preparing a histogram on the basis of the image data thus extracted, said histogram having a lateral axis representing a deviation amount and a longitudinal axis representing a frequency corresponding to a number of said image data; and detecting an object and a distance to said object by deleting said frequency having a smaller number of said image data than a threshold value along said lateral axis on said histogram.

10. The vehicle monitoring method according to claim 9, wherein said grouping step comprises the step of:

grouping said block into the same group as adjacent blocks when said block has a similar distance to said adjacent blocks whose group number is known, and grouping said block into a group denoted by a new number when said block has a similar distance to said adjacent blocks whose group number is unknown.

11. The vehicle monitoring method according to claim 9, wherein said histogram preparing step comprises the steps of:

dividing said distance image into lattice-like divisions, and preparing said histogram for each of said divisions.

12. The vehicle monitoring method according to claim 9, further comprising the steps of:

memorizing a number of said groups to which said image data belongs; and memorizing a number of said image data to which each of said groups belongs as an area size.

13. A monitoring method of a vehicle for watching an object in a vicinity thereof, having a pair of stereoscopic CCD cameras mounted on a front portion of said vehicle for obtaining a distance image including an image data and a three-dimensional distance information about said object, comprising the steps of:

deriving a distance information about said object from said distance images;

determining a plurality of groups based on said distance information;

calculating an area of each of said groups;

imaging a road shape by extracting a line painted on a road in front of said vehicle;

calculating a three dimensional coordinate value of said object;

determining values which exceed a predetermined threshold value;

deciding an area of corresponding group by referring to a memory;

determining larger values of said area than a predetermined value;

rewriting a histogram data of said larger values by comparing a frequency thereof; and detecting a distance of said object by counting a number of deviations from said frequency so as to be precisely detectable of an unevenness of a surface of said object.

* * * * *